US010972346B2

(12) United States Patent
McCullough et al.

(10) Patent No.: US 10,972,346 B2
(45) Date of Patent: *Apr. 6, 2021

(54) CUSTOMIZABLE EVENT PROCESSING FOR THIRD PARTY INFRASTRUCTURE EVENTS

(71) Applicant: Red Hat, Inc., Raleigh, NC (US)

(72) Inventors: Gregory McCullough, Kinnelon, NJ (US); Jason Frey, Cedar Knolls, NJ (US); Oleg Barenboim, Englewood Cliffs, NJ (US); Lianhua Fu, Montville, NJ (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/750,884

(22) Filed: Jan. 23, 2020

(65) Prior Publication Data

US 2020/0162327 A1    May 21, 2020

Related U.S. Application Data

(63) Continuation of application No. 15/055,340, filed on Feb. 26, 2016, now Pat. No. 10,554,491.

(51) Int. Cl.
*H04L 12/24* (2006.01)
*H04L 29/08* (2006.01)
*G06F 9/455* (2018.01)

(52) U.S. Cl.
CPC ...... *H04L 41/0816* (2013.01); *G06F 9/45533* (2013.01); *G06F 9/45558* (2013.01);
(Continued)

(58) Field of Classification Search
CPC . H04L 41/0816; H04L 41/06; H04L 41/0879; H04L 41/0893; H04L 67/10;
(Continued)

(56) References Cited

U.S. PATENT DOCUMENTS 8,677,333 B2    3/2014  Frank et al.
8,832,690 B1    9/2014  Li et al.
(Continued)

OTHER PUBLICATIONS

Oracle Product Management and Development Teams, "Oracle Complex Event Processing: Lightweight Modular Application Event Stream Processing in the Real World", <oracle.com/technetwork/middleware/complex-event-processing/overview/oracle-37.pdf>, An Oracle White Paper, 24 pages, Updated on Jun. 2009, Redwood Shores, CA.

(Continued)

*Primary Examiner* — S M A Rahman
(74) *Attorney, Agent, or Firm* — Lowenstein Sandler LLP

(57) ABSTRACT

A processing device receives a request to include a custom action in a processing definition. The custom action is to be performed in response to an occurrence of an infrastructure event in a third party infrastructure platform. The processing device selects the processing definition that specifies a default action to be performed in response to the occurrence of the infrastructure event. The default action being defined by an infrastructure management platform managing the third party infrastructure platform. The processing device receives, from the third party infrastructure platform, user input defining the custom action relative to the default action in the processing definition and changes the processing definition to include the custom action relative to the default action.

20 Claims, 6 Drawing Sheets

(52) U.S. Cl.
CPC .......... *H04L 41/06* (2013.01); *H04L 41/0879* (2013.01); *H04L 41/0893* (2013.01); *H04L 67/10* (2013.01); *H04L 67/26* (2013.01); *G06F 2009/4557* (2013.01); *G06F 2009/45579* (2013.01)

(58) Field of Classification Search
CPC . H04L 67/26; G06F 9/45533; G06F 9/45558; G06F 2009/4557; G06F 2009/45579
See application file for complete search history.

(56) References Cited

U.S. PATENT DOCUMENTS

| | | | |
|---|---|---|---|
| 8,856,319 | B1 | 10/2014 | Huang et al. |
| 8,935,293 | B2 | 1/2015 | Park et al. |
| 9,038,062 | B2 | 5/2015 | Fitzgerald et al. |
| 9,086,917 | B1* | 7/2015 | Fitzgerald ............... G06F 21/53 |
| 9,146,764 | B1 | 9/2015 | Wagner |
| 9,383,993 | B2 | 7/2016 | Nigul |
| 9,697,019 | B1* | 7/2017 | Fitzgerald ............... H04L 41/08 |
| 2008/0126333 | A1 | 5/2008 | Bezar et al. |
| 2008/0134175 | A1 | 6/2008 | Fitzgerald et al. |
| 2010/0125477 | A1* | 5/2010 | Mousseau ............. G06F 9/5077 717/177 |
| 2012/0102402 | A1 | 4/2012 | Kwong |
| 2014/0109063 | A1 | 4/2014 | Schissel et al. |
| 2014/0129698 | A1 | 5/2014 | Seago et al. |
| 2014/0282101 | A1* | 9/2014 | Beechuk ................ G06Q 50/01 715/753 |
| 2015/0026293 | A1 | 1/2015 | Tan et al. |
| 2015/0067394 | A1 | 3/2015 | Naseh et al. |
| 2015/0089031 | A1 | 3/2015 | Kalali |

OTHER PUBLICATIONS

Stokes, "Reference Architecture: Real-Time Event Processing with Microsoft Azure Stream Analytics", <azure.microsoft.com/en-us/documentation/articles/stream-analytics-real-time-event-processing-reference-architecture/>, 3 pages, last updated on Nov. 23, 2015.
USPTO, Office Action for U.S. Appl. No. 15/055,340, dated Jan. 29, 2018.
USPTO, Final Office Action for U.S. Appl. No. 15/055,340, dated Jul. 31, 2018.
USPTO, Office Action for U.S. Appl. No. 15/055,340, dated Jan. 10, 2019.
USPTO, Final Office Action for U.S. Appl. No. 15/055,340, dated Jun. 24, 2019.
USPTO, Advisory Action for U.S. Appl. No. 15/055,340, dated Aug. 23, 2019.
USPTO, Notice of Allowance for U.S. Appl. No. 15/055,340, dated Sep. 23, 2019.

* cited by examiner

CUSTOMIZABLE EVENT PROCESSING FOR THIRD PARTY INFRASTRUCTURE EVENTS

RELATED CASE

The present application is a continuation of application Ser. No. 15/055,340, filed Feb. 26, 2016, entitled "Customizable Event Processing For Third Party Infrastructure Events", which is incorporated by reference herein.

TECHNICAL FIELD

The present disclosure relates to event processing, and more particularly, to customizable event processing for third party infrastructure events.

BACKGROUND

Computing infrastructures, such as storage systems, virtualization systems, and networking systems, can be provided as resources via data centers and/or cloud computing environments. Various infrastructure events may occur for the resources (e.g., physical resources, virtual resources), such as, creating a resource, provisioning a resource, running a resource, de-provisioning a resource, etc. Event notifications can be generated for the infrastructure events. Typically, one or more management actions are performed in response to occurrences of events. The management actions are generally pre-defined and fixed and do not allow for third party customization.

BRIEF DESCRIPTION OF THE DRAWINGS

The present disclosure will be understood more fully from the detailed description given below and from the accompanying drawings of various implementations of the disclosure.

DETAILED DESCRIPTION

Figure 1:
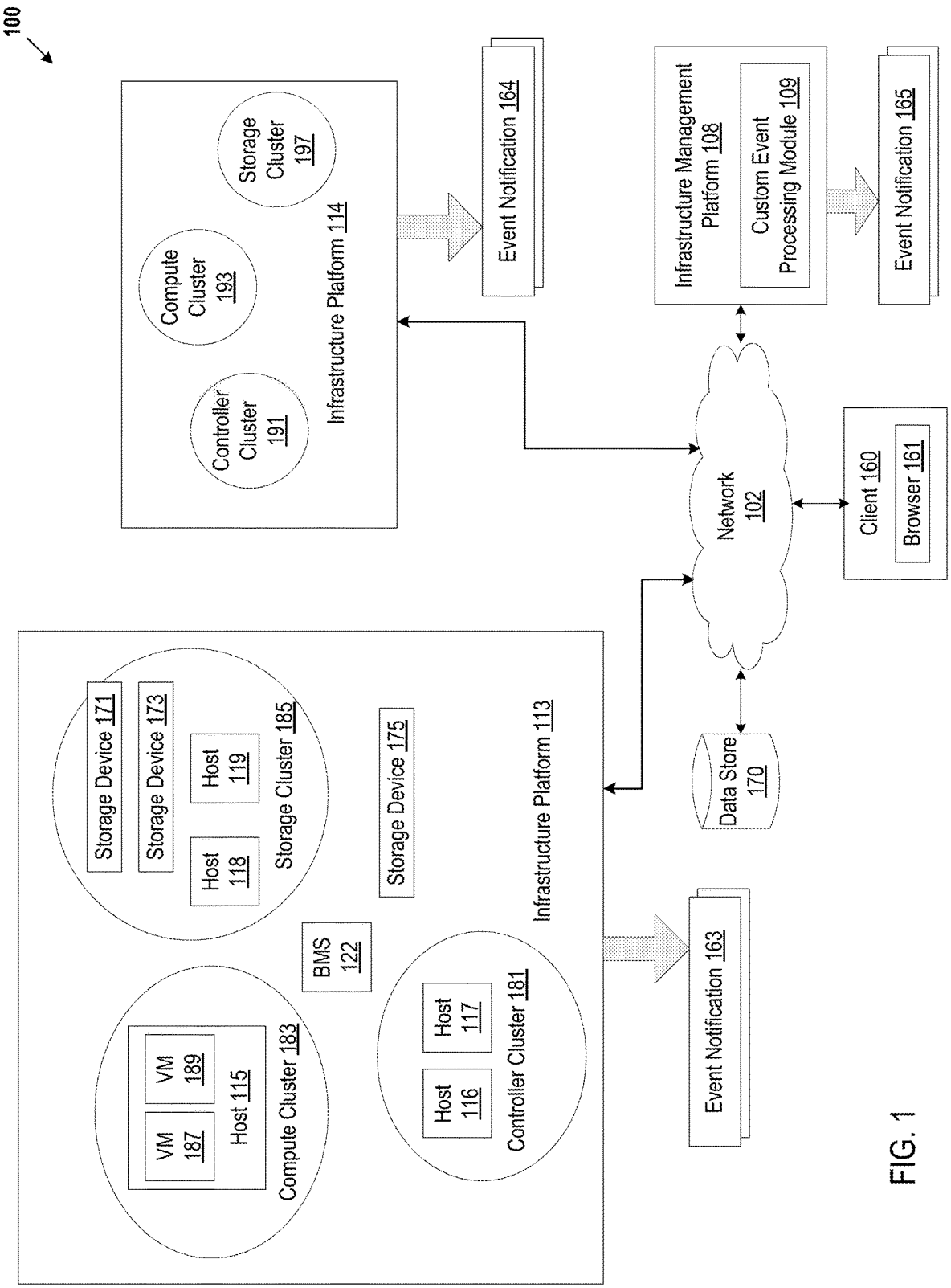
FIG. 1 is an example system architecture in which implementations of the present disclosure can be implemented.

Aspects and implementations of the present disclosure are directed to customizable event processing for third party infrastructure events. A computing infrastructure can be a data center or a cloud, and can include a non-virtual layer and a virtual layer. The virtual layer can include virtual resources, such as virtual machines (VMs), containers, and virtual storage. The non-virtual layer can include physical resources, such as a bare metal system (BMS), host machines, and storage devices. A bare metal system is represented by a computing operating system running on physical hardware without a virtualization layer.

An infrastructure event is an action or occurrence by a component (e.g., physical resource, virtual resource) of a computing infrastructure that can be recognized by software. An infrastructure event can be generated or triggered by the component or by system (e.g., management system) in the computing infrastructure. Various computing infrastructure events may occur, such as, creating a resource, provisioning a resource, running a resource, suspending a resource, de-provisioning a resource, etc. The infrastructure platforms can be provided by third party providers (e.g., cloud provider, data center provider). Multiple infrastructure platforms provided by the same and/or different third party provider can be managed by a single centralized infrastructure management platform. Examples of an infrastructure management platform 108 can include and are not limited to Red Hat® CloudForms and ManageIQ®. An infrastructure management platform can provision resources across the multiple and/or different infrastructure platforms, enable metering and billing across the multiple and/or different infrastructure platforms, implement policies, and/or provide workload optimization across the multiple and/or different infrastructure platforms. An infrastructure management platform that manages the third party infrastructure platforms can perform various management actions in response the events occurring. The types of actions, the number of actions, and the order for the actions to occur are typically pre-defined and fixed by the infrastructure management platform. Generally, the management actions are limited to actions being performed within the infrastructure management platform. Aspects and implementations of the present disclosure can provide flexibility and customization in defining what actions should be performed, the number of actions to be performed, and the order for performing the actions. Aspects and implementations of the present disclosure can allow actions to be performed that involve a third party infrastructure platform, such as sending notifications to a system and/or user of a third party infrastructure platform.

There may be time sensitive actions that should be performed for a particular infrastructure platform when an infrastructure event occurs. A time sensitive action is an action that should be performed within a specified time period. The action and/or time period can be configurable and/or user-defined, for example, by one or more policies. Traditional event handling solutions generally apply the same pre-defined, fixed order for the actions to all of the infrastructure platforms being managed. Depending on a policy of an infrastructure platform, time sensitive actions may not be performed within an allotted time period. Unlike conventional event handling solutions, aspects and implementations of the present disclosure can customize the order for actions to be performed, for each of the infrastructure platforms to ensure that time sensitive actions are performed within an allotted time period. Aspects and implementations of the present disclosure can apply different custom event handling processes to different infrastructure platforms. The policy data may prioritize the actions to be performed, and aspects and implementations of the present disclosure can customize the order for the custom actions based on the prioritization. An infrastructure management platform can perform one or more pre-defined default actions in response to an event occurrence. The pre-defined default actions can be defined by a user (e.g., system administrator, developer) of the infrastructure management platform. A custom action is an action that is defined by a third party provider (e.g., cloud provider, data center provider). A custom action can include a change that is made to a pre-defined default action. An example of the change can include changing parameters of a pre-defined default action. The change can be specified by a third party provider and/or a user (e.g., system administrator, developer) of the infrastructure management platform.

An infrastructure management platform can include pre-defined default event handling processes (e.g., default workflows) for performing one or more pre-defined default actions in a particular order in response to an event occurrence. The pre-defined default event handling processes can be defined by a user of the infrastructure management platform. A custom event handling process is an order of actions and that is defined by a third party provider (e.g., cloud provider, data center provider). A custom event handling process can include a change that is made to the order of a pre-defined default event handling process. Examples of the change to the order can include removing a pre-defined default action, adding a default action, changing the order of performing a pre-defined default action, etc. The change can be specified by a third party provider and/or a user (e.g., system administrator, developer) of the infrastructure management platform.

FIG. 1 is an example system architecture 100 in which implementations of the present disclosure can be implemented. The system architecture 100 can include one or more infrastructure platforms 113,114. The infrastructure platforms 113,114 can be implemented with one or more clouds, and/or one or more data centers. There can be a large number of infrastructure platforms 113,114. For brevity and simplicity, two infrastructure platforms 113,114 (e.g., clouds, data centers) are illustrated and used as an example throughout this document. The infrastructure platforms 113, 114 can provide resources (e.g., compute resources, storage resources, network resources) to one or more entities. An entity, as referred to herein, can represent any software provider, service provider, a business organization such as a corporation, an educational institution such as a college and university, etc. For example, several sub-entities may be different departments within the same entity, such as an Enterprise company, and may store and access data in the infrastructure platform 113.

The infrastructure platforms 113,114 can be a data center, a private cloud, a public cloud, or a hybrid cloud. The resources provided by an infrastructure platform 113,114 can be virtual resources and/or physical resources. The resources can include virtual infrastructure component, physical infrastructure components, software defined networks, software defined storage, middle ware, and applications. The individual infrastructure platforms 113,114 can be a physical data center that includes physical computer racks ("racks") each of which has a large number of computers, network devices, and storage devices that are interconnected.

The infrastructure platforms 113,114 can be provided by, for example, the same or different infrastructure providers. For example, infrastructure platform 113 may be a cloud and may be provided by Cloud-Provider-A, and infrastructure platform 114 may be a data center that is being provided by Data-Center-Provider-A. An infrastructure provider (e.g., cloud provider, data center provider) can provide more than one infrastructure platform.

As described above, the infrastructure platforms 113,114 can include a non-virtual layer and a virtual layer. The virtual layer can include virtual resources, such as VMs 187,189 and containers. A container can refer to an isolated set of resources allocated to executing an application and/or process independent from other applications and/or processes. A virtual machine can be a software implementation of a machine (computer) that includes its own operating system (referred to as a guest operating system) and executes application programs.

The non-virtual layer can include physical resources, such as bare metal systems (e.g., BMS 122) and host machines ("host") (e.g., host machines 115-119). A bare metal system 122 is a computing operating system executing on physical computing hardware without a virtualization layer. Host machines 115-119 are physical computing machines that host software (e.g, applications, servers) and/or a virtualization layer. For example, host machine 115 is the underlying computing hardware that includes a hypervisor to host VMs 187,189. Individual bare metal systems and host machines can be a server computer system, a desktop computer or any other computing device.

The infrastructure platforms 113,114 can provide compute resources, storage resources, and/or network resources to entities. Compute resources can include processing devices, bare metal systems (e.g., BMS 122), virtual machines (e.g., VMs 187,189), software containers, host machines 115-119, applications, memory, hypervisors, etc. Storage resources can include, and are not limited to, storage servers, storage software, disks, data stores, software defined storage, etc. Network resources can be virtual network resources, software defined networks, etc.

An example of infrastructure platforms 113,114 can include and is not limited to Red Hat® OpenStack®. The cloud infrastructure platforms 113,114 can implement one or more clusters. Each cluster can be dedicated to performing one or more certain functions. A cluster hereinafter refers to a group of connected hosts that work together for one or more particular functions. For example, the infrastructure platform 113 can include a controller cluster 181, a compute cluster 183, and one or more storage clusters 185. Infrastructure platform 114 can include a controller cluster 191, a compute cluster 193, and one or more storage clusters 197. Examples of functions can include, and are not limited to, virtualization, storage, networking, etc. For example, the controller clusters 181,191 can include one or more host machines (e.g., host machines 116,117) that include network management software for managing networking infrastructure, APIs (application programming interfaces), and communications for respective infrastructure platforms 113,114.

The compute clusters 183,193 can include one or more host machines (e.g., host machine 115) for hosting virtual machines (e.g., virtual machines 187,189). There can be a large number of virtual machines, containers, and/or containers within virtual machines in the infrastructure platforms 113,114. For brevity and simplicity, two virtual machines (e.g., VMs 187,189) hosted by host machine 115 are used as examples in system architecture 100.

The individual storage clusters 185,197 can include one or more hosts and one or more storage devices to manage storage for the data in the infrastructure platforms 113,114. For brevity and simplicity, two host machines 118,119, which can include storage servers, and two storage devices 171,173 in storage cluster 185 are used as examples in system architecture 100. For example, the storage cluster 185 can manage virtual hard drives on storage devices 171,173 for virtual machines 187,189 in the infrastructure platform 113. The storage devices 171,173 can create a storage array for storing data in the infrastructure platform 113.

The infrastructure platforms 113,114 can include one or more types of storage clusters. One type of storage cluster (e.g., storage cluster 185) can manage block storage for virtual disks, for example, for the virtual machines (e.g., VMs 187,189) in the compute cluster 183. Another type of storage cluster can manage object storage for files. Another type of storage cluster can manage both block storage and object storage in a single cluster for the virtual machines in the compute cluster.

Users can interact with applications executing on infrastructure resources, such as VMs 187,189 and storage servers on hosts 118,119, using client computer systems, such as client 160, via corresponding applications (e.g., web browser program 161). There can be a large number of clients. For brevity and simplicity, client 160 is used as an example in architecture 100. The client 160 can be connected to the one or more hosts 115-119 in the clusters (e.g., compute cluster 183, controller cluster 181, storage cluster 185) via a network 102. The client 160 can be a mobile device, a PDA, a laptop, a desktop computer, or any other computing device.

The infrastructure platforms 113,114 can be managed by an infrastructure management platform 108. The infrastructure management platform 108 can communicate with multiple cloud providers and/or data center providers, which can be third party systems. Examples of an infrastructure management platform 108 can include and are not limited to Red Hat® CloudForms and ManageIQ®. The infrastructure management platform 108 can manage infrastructures that have tree/graph based inventories, such as infrastructure platforms 113,114. The infrastructure platforms 113,114 can be coupled to the infrastructure management platform 108 via the network 102, which may be a private network (e.g., a local area network (LAN), a wide area network (WAN), intranet, or other similar private networks) or a public network (e.g., the Internet). The infrastructure management platform 108 can be hosted by one or more machines (e.g., server computers, desktop computers, etc.). The infrastructure management platform 108 can be maintained by a consumer, such as an Enterprise (e.g., business, company), of the infrastructure platform 108. In another implementation, the infrastructure management platform 108 can be maintained by a cloud provider or a data center provider. The infrastructure management platform 108 can be coupled to multiple infrastructure platforms 113,114 via one or more networks 102.

The infrastructure management platform 108 can add additional capabilities to the infrastructures platforms 113, 114. For example, the infrastructure management platform 108 can access policy data that is stored in a data store 170 to optimize workloads on resources of the infrastructures platforms 113,114 and can manage the deployment of resources (e.g., bare metal systems, hosts, virtual machines, containers, containers within VMs, storage devices, storage servers, etc.) in the infrastructures platforms 113,114. The infrastructure management platform 108 can receive input, for example, from a system administrator via the client 160, requesting a resource (e.g., VM, container, host, bare metal system, storage device, virtual storage, etc.) to be deployed in one or more of the infrastructure platforms 113,114. A request can be for a large number of resources, and the infrastructure management platform 108 can receive a large number of requests.

A data store 170 can be a persistent storage that is capable of storing data. A persistent storage can be a local storage unit or a remote storage unit. Persistent storage can be a magnetic storage unit, optical storage unit, solid state storage unit, electronic storage units (main memory), or similar storage unit. Persistent storage can be a monolithic device or a distributed set of devices. A 'set', as used herein, refers to any positive whole number of items.

Various computing infrastructure events may occur. The events can pertain to the resources in the infrastructure platforms 113,114 and/or can be events that are triggered by the infrastructure management platform 108. Examples of events can include creating a resource, provisioning a resource, running a resource, suspending a resource, de-provisioning a resource, changing a state of a resource, etc. Event notifications can be generated for the infrastructure events. The event notifications can be generated by the infrastructure platforms 113,114 and/or the infrastructure management platform 108.

The infrastructure management platform 108 can receive the event notifications and provide centralized event handling capability. The infrastructure management platform 108 can perform various management actions in response the events occurring. The infrastructure management platform 108 can include a custom event processing module 109 to allow a user (e.g., third party infrastructure system administrator) to customize the types of actions, the number of actions, and the order for the actions to be performed. The custom event processing module 109 can allow actions to be performed that involve a third party infrastructure platform, such as sending notifications to a system and/or user of a third party infrastructure platform. The infrastructure management platform 108 may not support all of the events types that are generated by the infrastructure platforms 113,114. The custom event processing module 109 can allow a user (e.g., third party infrastructure system administrator) to specify the event types that should be managed. The custom event processing module 109 can support different event types for different infrastructure platforms 113,1140

There may be time sensitive actions that should be performed for a particular infrastructure platform when an infrastructure event occurs. For example, notifications should be sent within a specified time period, inventory data should be updated within a specified time period, work flows should be triggered within a specified time period, etc. The various infrastructure platforms 113,114 may have different policies and time thresholds for the actions. Traditional event handling solutions generally have a pre-defined, fixed order for the actions to be performed that is applied to all of the infrastructure platforms 113,114. Depending on a policy of an infrastructure platform 113,114, time sensitive actions may not be performed within an allotted time period. Unlike conventional event handling solutions, the custom event processing module 109 can customize actions and can customize the order for actions to be performed, for each of the infrastructure platforms 113,114 to ensure that time sensitive actions are performed within an allotted time period. The policy data may prioritize the actions to be performed, and the order for the custom actions can be based on the prioritization. The customized actions can be based on third party user input from an infrastructure platform provider.

Events can be triggered and event notifications can be generated to provide notice of when a change is made to a resource in an infrastructure platform 113,114. The infrastructure platforms 113,114 and infrastructure management platform 108 can generate event notifications 163-165 for the events. Notifications 163-165 can be generated within a specified time from when a specific event happens. In one example, the infrastructure platforms and/or infrastructure management platform can generate the event notifications in JSON format, and place the event notifications in a message queue (e.g., AMQP queue) or an event queue. In another example, the infrastructure platforms and/or infrastructure management platform can format the event notifications into ATOM format and publish the event notifications as a feed.

The infrastructure management platform 108 can receive the event notifications 163-165 from the infrastructure platforms 113,114 by monitoring one or more message buses, message queues, event buses, and/or event queues of the infrastructure platforms 113,114 via a network 102. The infrastructure management platform 108 can raise its own events and generate event notifications 165, for example, in response to detecting an event notification 163,165 from the infrastructure platforms 213,214. For example, a virtual machine in infrastructure platform 113 may have been powered on and the infrastructure management platform 108 may have detected the event notification 163 for the power on event on the message bus of the infrastructure platform 113. The infrastructure management platform 108 can raise its own event, such as, a generic power on event and generate an event notification 165 for the generic power on event to trigger action(s) to be performed. For example, the generic power on event can cause an alert to be sent to a user and/or system, or can cause a message to be sent to the powered on resource.

Some infrastructure platforms can emit two event notifications for an individual task. For example, one event notification can be generated at the beginning of a lengthy task, such as instance create, and another event notification can be generated upon successful completion of the task. Notifications 163-165 can contain a source identifier, an event name, a message identifier, and a payload that includes data pertaining to the event.

Figure 2:
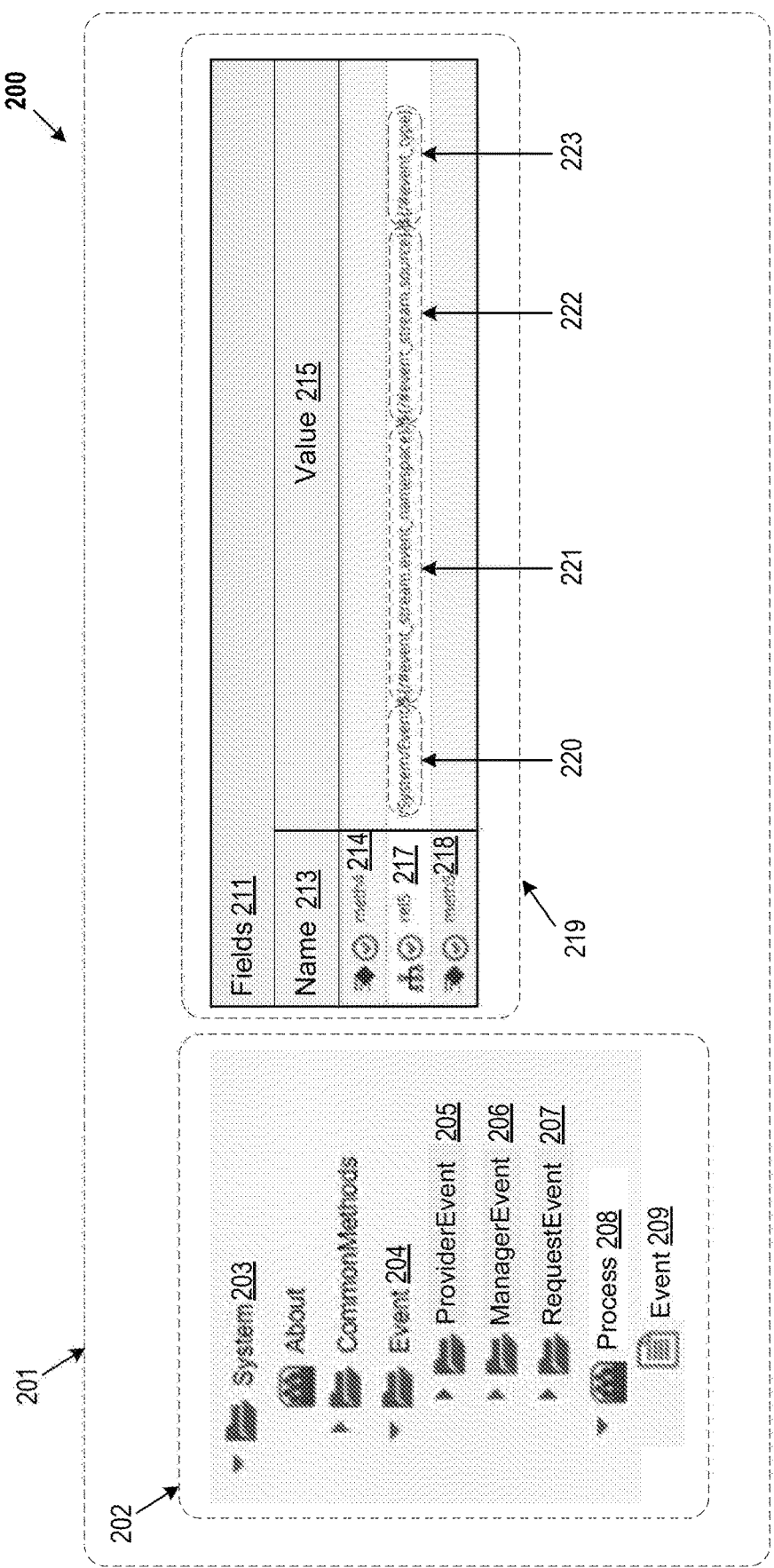
FIG. 2 is an example of an event processing model in a graphical user interface, in accordance with one or more implementations of the present disclosure.

FIG. 2 is an example of an event processing model 200 in a portion of a graphical user interface 201 (GUI), in accordance with one or more implementations of the present disclosure. The GUI 201 can be a user interface of an infrastructure management platform that is managing infrastructure platforms and events related to the infrastructure platforms. A portion 202 of the GUI 201 can display namespaces, such as a system namespace 203. A namespace is a declarative region that provides a scope to the identifiers (e.g., the names of classes, functions (e.g., methods), properties, variables, etc.) inside a respective namespace. Namespaces can organize identifiers into logical groups to prevent name collisions that can occur between identifiers that may be the same. Namespaces can also include namespaces. For example, the system namespace 203 can include an event namespace 204 and a process namespace 208.

A namespace can include classes. A class is a user defined type or data structure that has data and functions (also called methods). For example, the process namespace 208 can include an event class 209. A portion 219 of the GUI 201 can display the content of a class (e.g., event class 209) that is selected in the portion 202 GUI 201. A class can include data fields 211, and names 213 and corresponding values 215 for the fields 211, to define methods (e.g., methods 214,218) and relationships (e.g., relationship 217). A relationship 217 can be a redirection within the class to another class.

The event processing model 200 can specify a single entry point for events to enter for processing. The events can be related to resources in infrastructure platforms. The single entry point can be defined by the relationship 217 (e.g., "rel5") in the event class 209 in the process namespace 208. The single entry point can be an event namespace 204 in the system namespace 203. For example, when an event notification is received for an event, the relationship 217 in the event class 209 can be called to redirect the handling of the event to a namespace in the event namespace 204 in the system namespace 203. For example, the relationship 217 may have a value that includes the component 220 "/System/Event/" for redirecting the handing of an event to the event namespace 204 in the system namespace 203.

The event namespace 204 can include one or more event scope namespaces. For example, the event namespace 204 includes a ProviderEvent 205 namespace, a ManagerEvent 206 namespace, and a RequestEvent 207 namespace. The event scope namespaces correspond to various types of sources of events. The event processing model 200 can process events from a third party infrastructure platform provider (e.g., cloud provider, data center provider), events that are generated by an infrastructure management platform, and can request events to occur. The event processing model 200 can include an event scope namespace (e.g., ProviderEvent 205 namespace) for events from a third party infrastructure platform provider, an event scope namespace (e.g., ManagerEvent 206 namespace) for events, such as policy related events, that are generated by an infrastructure management platform, and an event scope namespace (e.g., RequestEvent 207 namespace) for events that are requested to occur. The relationship 217 can include a component 221, whose respective values can be selected from the substitution of a run-time variable, to designate the event scope namespace. For example, the component 221 (e.g., "${#event_stream.event_namespace}") can be translated into ProviderEvent 205 namespace, ManagerEvent 206 namespace, or a RequestEvent 207 namespace based on a run-time variable that is received when an event occurs.

Each of the event scope namespaces (e.g., ProviderEvent 205 namespace, ManagerEvent 206 namespace, RequestEvent 207 namespace) can include one or more source classes, as described in greater detail below in conjunction with FIG. 3. A source class can correspond to a particular source (e.g., a particular cloud provider, a particular data center provider) of events. For example, the ProviderEvent 205 name space can include a class for "Provider-1", a class for "Provider-2", etc. The relationship 217 can include a component 222, whose respective value can be selected from the substitution of a run-time variable, to designate the source class. For example, the component 222 (e.g., "${/#event_stream.source}") can be translated into a class for Provider-1 based on a run-time variable that is received when an event occurs.

Each source class can include one or more instances of the class, as described in greater detail below in conjunction with FIG. 3. There can be an instance for each event type associated with a provider. For example, Cloud-Provider-A may have event types for creating a VM, deleting a VM, etc. An instance is a processing definition of the action(s) to be performed responsive to an event occurring for the corresponding event type and/or a definition of the relationship(s) between, for example, the event type and one or more event handlers. The relationship 217 can include a component 223, whose respective value can be selected from the substitution of a run-time variable, to designate the instance. For example, the component 223 (e.g., "${/#event_type}") can be translated into an instance for running a VM based on a run-time variable that is received when an event occurs.

Figure 3:
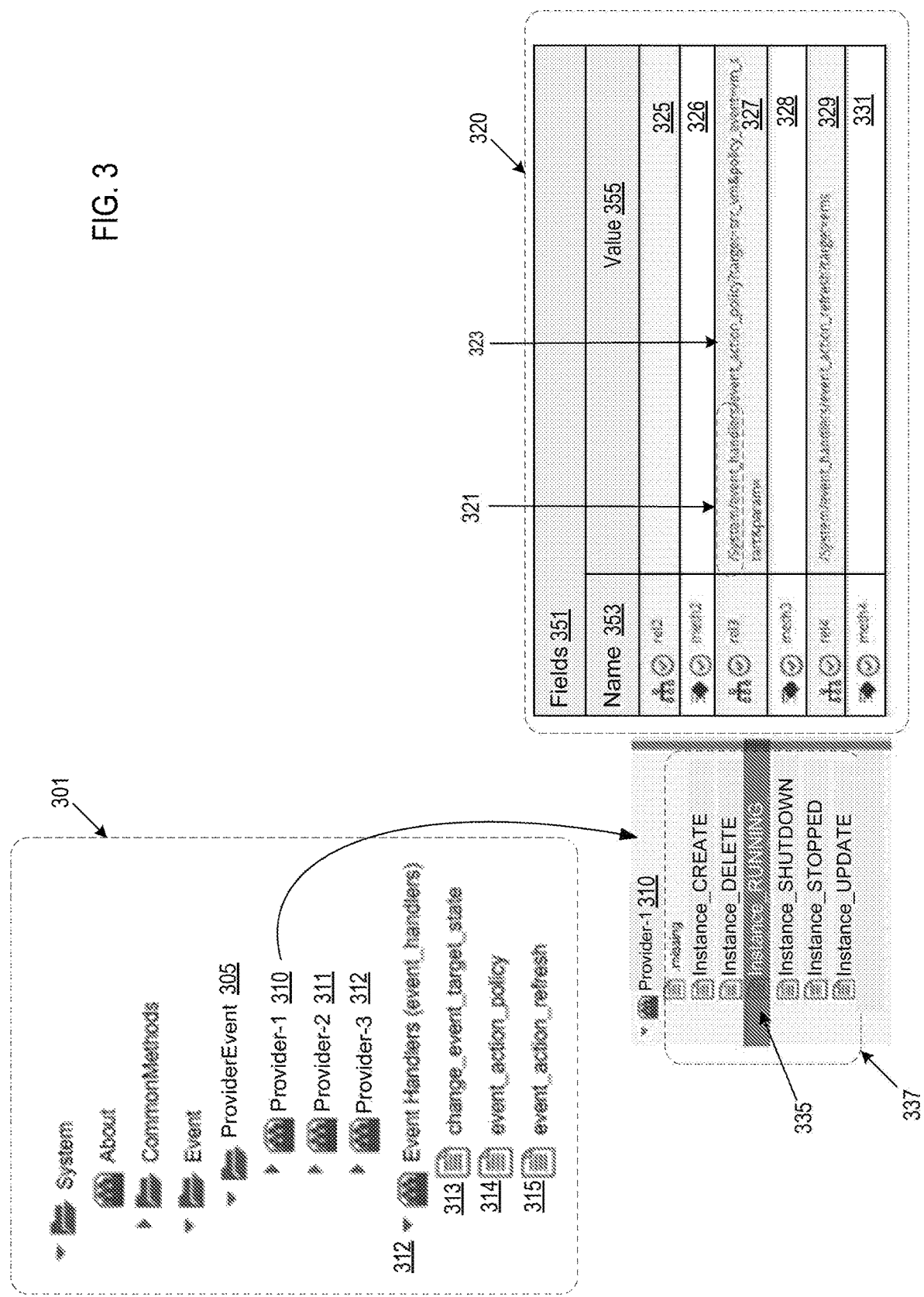
FIG. 3 is an example of an event processing definition, in accordance with one or more implementations of the present disclosure.

FIG. 3 is an example of an event processing definition 320, in accordance with one or more implementations of the present disclosure. A portion 301 of a GUI can display a namespace (e.g., ProviderEvent 305 namespace) that includes source classes for third party infrastructure platform providers (e.g., cloud providers, data center providers). An infrastructure management platform can manage a large number of third party infrastructure platforms. For brevity and simplicity, source classes 310-312 for three infrastructure platforms are illustrated for the ProviderEvent 305 namespace and used as examples throughout this document.

Each source class 310-312 can include one or more instances for a respective class. As described above, there can be an instance for each event type associated with an infrastructure provider. An instance is a processing definition of the event processing for the corresponding event type. For example, Provider-1 may have event types for creating a VM, deleting a VM, running a VM, shutting down a VM, stopping a VM, etc., and the Provider-1 310 source class can include a set of instances 337 (e.g., processing definitions) for corresponding event types for the Provider-1 310 source class. An instance is hereinafter also referred to as a "processing definition" throughout this document.

The GUI can display the content of a processing definition 320 of an instance (e.g., Instance_RUNNING 335) that is selected in the GUI. The processing definition 320 can be a work flow that includes an order for a series of relationships and methods to be executed. The processing definition 320 can include data fields 351, and names 353 and corresponding values 355 for the fields 351, to define methods and relationships.

The processing definition 320 can specify one or more default actions to be performed in response to the occurrence of the corresponding infrastructure event. A default action is an action that is pre-defined by a user (e.g., system administrator) of an infrastructure management platform. Examples of a default action can include, and are not limited to, processing a control policy for the event, sending a notification to a user and/or system, sending an alert to a user and/or system, raising an event, and triggering a refresh to retrieve details for the event.

The processing definition 320 can define one or more relationship(s) between the event type and one or more event handlers. A relationship between the event type and a particular event handler can be used to define a default action that should be performed when an event of the particular event type occurs. A relationship can point to, for example, an event handler, which can perform the default action, in an event handler namespace 312. The event handler namespace 312 can include one or more event handlers (e.g., event handlers 313-315). The event handlers 313-315 can be instances having methods that perform the actual granular actions for processing for an event. The methods can be built into the infrastructure management platform and the code of the methods can be hidden. The event handlers 313-315 can be software routines that process actions. An event handler 313-315 can be a function or method containing program statements that are executed in response to an event. The input for the event handler can be arguments from the event notifications or one or more values in the key-values pairs in the event notifications. The event handlers 313-315 can use the input to perform the action(s).

For example, the processing definition 320 can specify a default action via relationship 327 for processing a control policy by calling an event_action_policy handler 314 to trigger a policy event (e.g., vm_start policy event). In another example, the processing definition 320 can specify a default action via relationship 329 for triggering a refresh to retrieve details for the event by calling an event_action_refresh handler 315 to trigger the refresh. A relationship (e.g., relationship 327,329) value can include a component (e.g., "/System/event handlers" 321) to redirect the event handling to the event handler namespace 312, and a component (e.g., component 323) to redirect to an event handler in the event handler namespace 312.

The processing definition 320 work flow can include placeholders in the order for the series of relationships and methods for custom actions to be performed in response to an occurrence of an event. Examples of custom actions can include, for example, sending a message to a system and/or user of the third party infrastructure platform. The placeholders can be fields for values for defining relationships and/or methods. The placeholders can be located before a default action in the order to specify that a custom action that is defined by such a placeholder should be performed before the default action. For example, a default action can be defined via a relationship 327. The processing definition 320 work flow can include placeholders 325,326 for defining a relationship or method to be executed before the default action at relationship 327. In another example, the placeholders can be located after a default action in the order to specify that a custom action that is defined by such a placeholder should be performed subsequent to performing the default action. In another example, a default action that is defined by a relationship or method in the processing definition 320 can be replaced by the definition of a custom action. The GUI can include one or more UI elements for receiving user input to modify the processing definition 320.

A custom action may be defined by a third party infrastructure platform provider. A user (e.g., system administrator) of the third party infrastructure platform provider can provide user input, for example, that defines a relationship to redirect processing to an event handler. In another example, the user input can define a method. In another example, the user input can be a third party script and a definition for relationship that points to the script. The user input can be received via the GUI.

Figure 4:
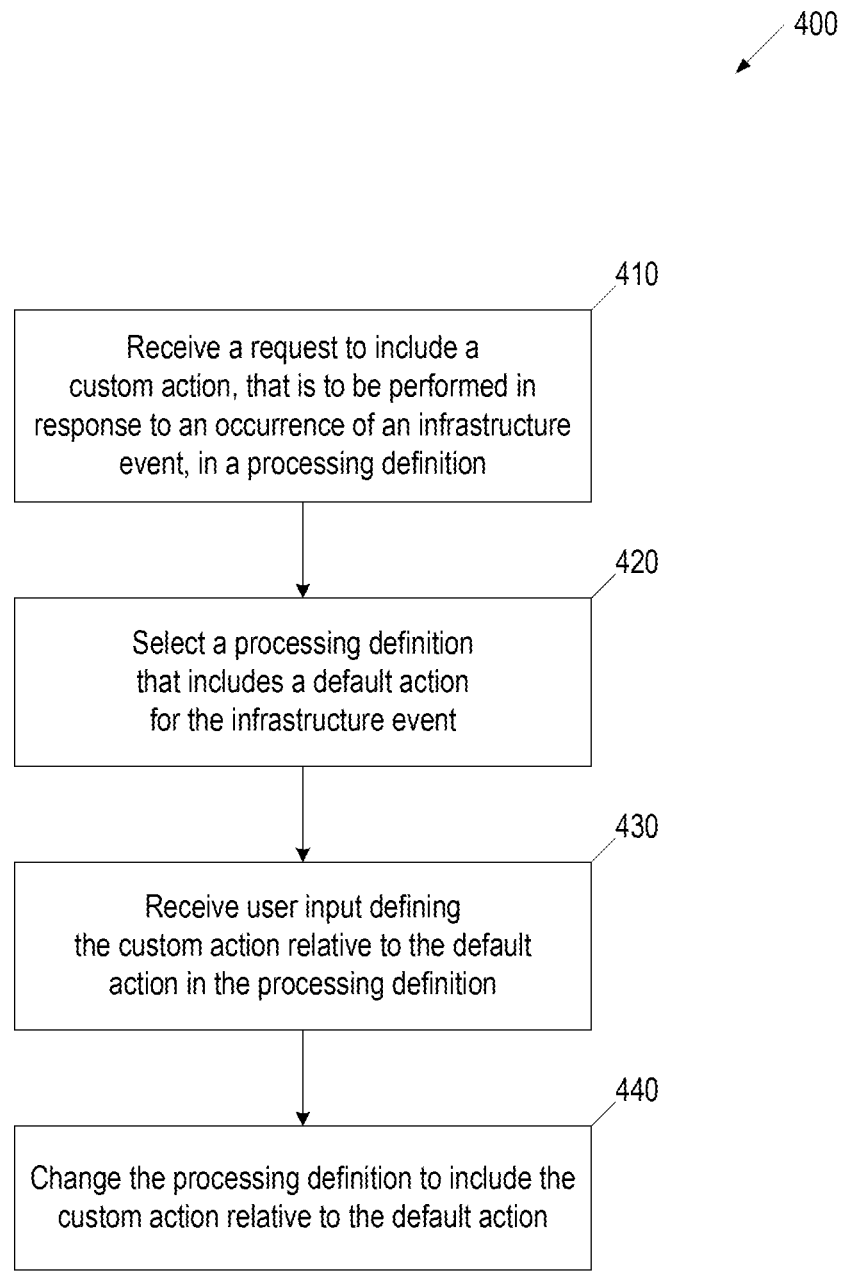
FIG. 4 is a flow diagram for a method for changing an event processing definition to include a custom action to be performed in response to occurrence of an infrastructure event, in accordance with one or more implementations of the present disclosure.

FIG. 4 is a flow diagram for a method 400 for changing an event processing definition to include a custom action to be performed in response to occurrence of an infrastructure event, in accordance with one or more implementations of the present disclosure. Method 400 can be performed by processing logic that can comprise hardware (e.g., circuitry, dedicated logic, programmable logic, microcode, etc.), software (e.g., instructions run on a processing device), or a combination thereof. In one implementation, method 400 is performed by a resource evaluator (e.g., custom event processing module 109 of FIG. 1) executed by a processing device in a computing machine. At least a portion of method 400 can be performed automatically by the computing machine without user interaction.

At block 410, the processing device receives a request to include a custom action in a processing definition. The custom action is to be performed in response to an occurrence of an infrastructure event in a third party infrastructure platform. The infrastructure event can pertain to a physical resource (e.g., host machine, bare metal system) or virtual resource (e.g., virtual machine, container, virtual disk, etc.) in the third party infrastructure platform. For example, the event may be for creating a resource, deleting a resource, provisioning a resource, running a resource, suspending a resource, de-provisioning a resource, shutting down a resource, stopping a resource, etc.

The request can be received via a graphical user interface (GUI) of an infrastructure management platform that is managing the third party infrastructure platform. The custom action can include, for example, sending a message to a system in the third party infrastructure platform. For example, the custom action may be to send a notification to a user (e.g., system administrator) and/or system of a cloud or data center indicating that a virtual machine is being suspended.

At block 420, the processing device selects a processing definition that includes a default action, for the infrastructure event. There can be more than one default action that is specified in the processing definition. The default action can be defined by an infrastructure management platform that manages the third party infrastructure platform. The request can include a source identifier and an event type identifier, and the processing device can use the source identifier and the event type identifier to select the processing definition. For example, the source identifier may be Provider-1 and the event type identifier may be an event name "VM_RUN". The processing device may determine from the mapping data, which can be stored in a data store, for Cloud-Provider-1 that the event type for the event notification is a running event type. The processing device can select the processing definition, in view of the event type (e.g., running event type), from a set of processing definitions (e.g., processing definitions 337 in FIG. 3) associated with the source (e.g., Provider-1). For example, the processing device can select the Instance_RUNNING (e.g., Instance_RUNNING 335 in FIG. 3) as the processing definition for the event.

At block 430, the processing device receives user input from the third party infrastructure platform that defines the custom action relative to the default action in the processing definition. More than one custom action can be defined. The processing definition can specify an order of actions to be performed. At least one of the actions in the order of actions in the processing definition can be a default action that is defined by user input from a user (e.g., system administrator) of an infrastructure management platform that is managing the third party infrastructure platform. The user input can include, for example, a third party script, a third party definition of a method, and/or a definition of a redirection to an event handler.

The user input can include selection of placeholders in positions relative to one or more default action definitions in the processing definition. The positions for the custom actions in the processing definition can be based on one or more policies (e.g., third party policies, infrastructure management policies), which are stored in a data store, that include time thresholds for performing time sensitive actions. For example, a policy may specify that a notification of a powered off system should be sent to a system administrator within a specified time period (e.g., 1 minute) from the occurrence of a power off event. The custom action defining the notification to be sent to the system administrator can be placed in the order of actions in the processing definition to cause the custom action to be executed within the specified time period. For example, the custom action may be placed as the first action to be performed in the order of actions. The policy data may prioritize the actions to be performed, and the positions for the custom actions in the processing definition can be based on the prioritization. The user input can include data to populate the selected placeholders with definitions for relationships and/or methods for a corresponding custom action.

At block 440, the processing device changes the processing definition to include the custom action relative to the default action. The processing device can populate the selected placeholders, which are in positions relative to one or more default actions, based on the user input that defines relationships and/or methods for a corresponding custom action. For example, depending on a position of a selected placeholder, the change to the processing definition can include adding the custom action to the processing definition to execute the custom action prior to executing the default action, adding the custom action to the processing definition to execute the custom action subsequent to executing the default action, editing an existing custom action, or replacing the default action with the custom action. The change can include adding the custom action to the processing definition to cause the custom action to be performed within a time period that is specified in a policy.

Figure 5:
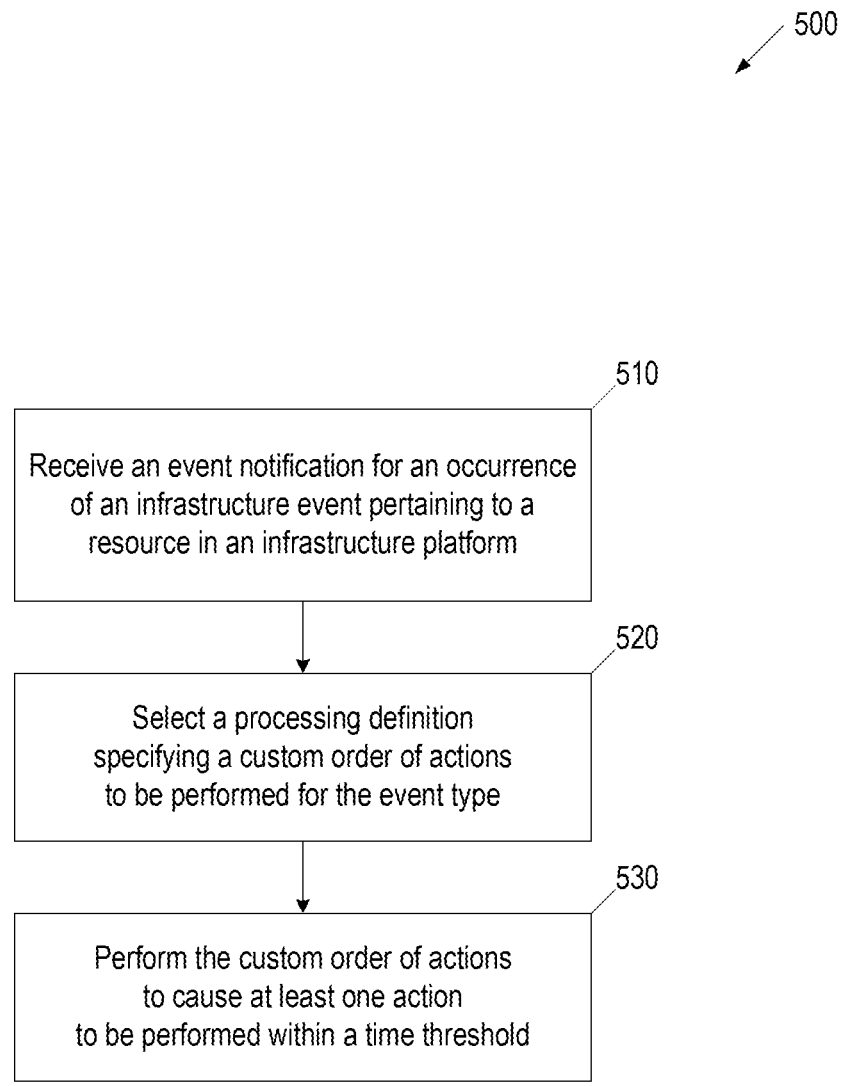
FIG. 5 is a flow diagram for a method for performing a third party defined custom action responsive to an occurrence of an infrastructure event, in accordance with one or more implementations of the present disclosure.

FIG. 5 is a flow diagram for a method 500 for performing a third party defined custom action responsive to an occurrence of an infrastructure event, in accordance with one or more implementations of the present disclosure. Method 500 can be performed by processing logic that can comprise hardware (e.g., circuitry, dedicated logic, programmable logic, microcode, etc.), software (e.g., instructions run on a processing device), or a combination thereof. In one implementation, method 500 is performed by a resource evaluator (e.g., custom event processing module 109 of FIG. 1) executed by a processing device in a computing machine. At least a portion of method 500 can be performed automatically by the computing machine without user interaction.

At block 510, the processing device receives an event notification for an occurrence of an infrastructure event in an infrastructure platform. The processing device can monitor one or more message buses, message queues, event buses, and/or event queues on various infrastructure platforms for events and can receive the event notification via a single entry point in an infrastructure management platform that is managing the infrastructure platform. The single entry point can be an event namespace (e.g., event namespace 204 in FIG. 2) in a system namespace (e.g., system namespace 203 in FIG. 2).

At block 520, the processing device selects a processing definition that specifies a custom order of actions to be performed for the event type. Notifications can contain a source identifier, an event name, a message identifier, and a payload that includes data pertaining to the event. The processing device can extract arguments from the event notification and use the argument(s) to select a processing definition. The arguments passed to the event handler can include the provider specific details for the event source. For example, for a USER RUN VM event for Provider-2, the provider specific details can include API (application programming interface) identifiers and hypertext references (hrefs) describing the event source.

For example, the processing device may determine that the event is "VM_RUN", and the processing device may determine from mapping data, which is stored in a data store, for Cloud-Provider-1 that the event type for the event notification is a running event type. The processing device can select the processing definition, in view of the event type (e.g., running event type), from a set of processing definitions (e.g., processing definitions 337 in FIG. 3) associated with the source (e.g., Provider-1). For example, the processing device can select the processing definition "Instance_RUNNING" (e.g., Instance_RUNNING 335 in FIG. 3) for the event.

The custom order in the processing definition for performing the actions can include ordering the custom action to cause the custom action to be performed prior to performing a default action. The custom order can include ordering the custom action to cause the custom action to be performed subsequent to performing a default action. The custom order can include replacing a default action with a custom action. The processing definition can specify a custom action to be performed responsive to the occurrence of the infrastructure event. The custom action can include, for example, sending a message to a system in the infrastructure platform. The custom action can be defined by a third party provider of the infrastructure platform.

In one example, the processing device can select a processing definition by creating the processing definition. The processing device may determine that the infrastructure event is not supported by the infrastructure management platform, and can receive user input to create the processing definition from the third party infrastructure platform. The processing device can determine the default action to be performed for the infrastructure event and can create the processing definition based on the user input and the default action. The default action can be determined, for example, from configuration data that is stored in a data store. The configuration data can be configurable and/or user-defined.

At block 530, the processing device performs the custom action by executing an event handler that is specified in the processing definition. The event handlers can translate the provider specific arguments into infrastructure management platform object identifiers and use the object identifiers to perform the custom action. The custom action can be performed prior to performing a default action that is specified in the processing definition or subsequent to performing a default action that specified in the processing definition. In another example, the custom action can minimize the number of actions to be performed by replacing the default action that is specified in the processing definition. The custom action can include sending a message to a system and/or user of the third party infrastructure platform. The custom action may be a time sensitive action that should be performed for a particular infrastructure platform within a specified time period and/or before or after certain actions, as specified by a policy. For example, notifications should be sent within a time threshold, inventory data should be updated within a time threshold, workloads re-balancing should be triggered within a time threshold, etc.

Figure 6:
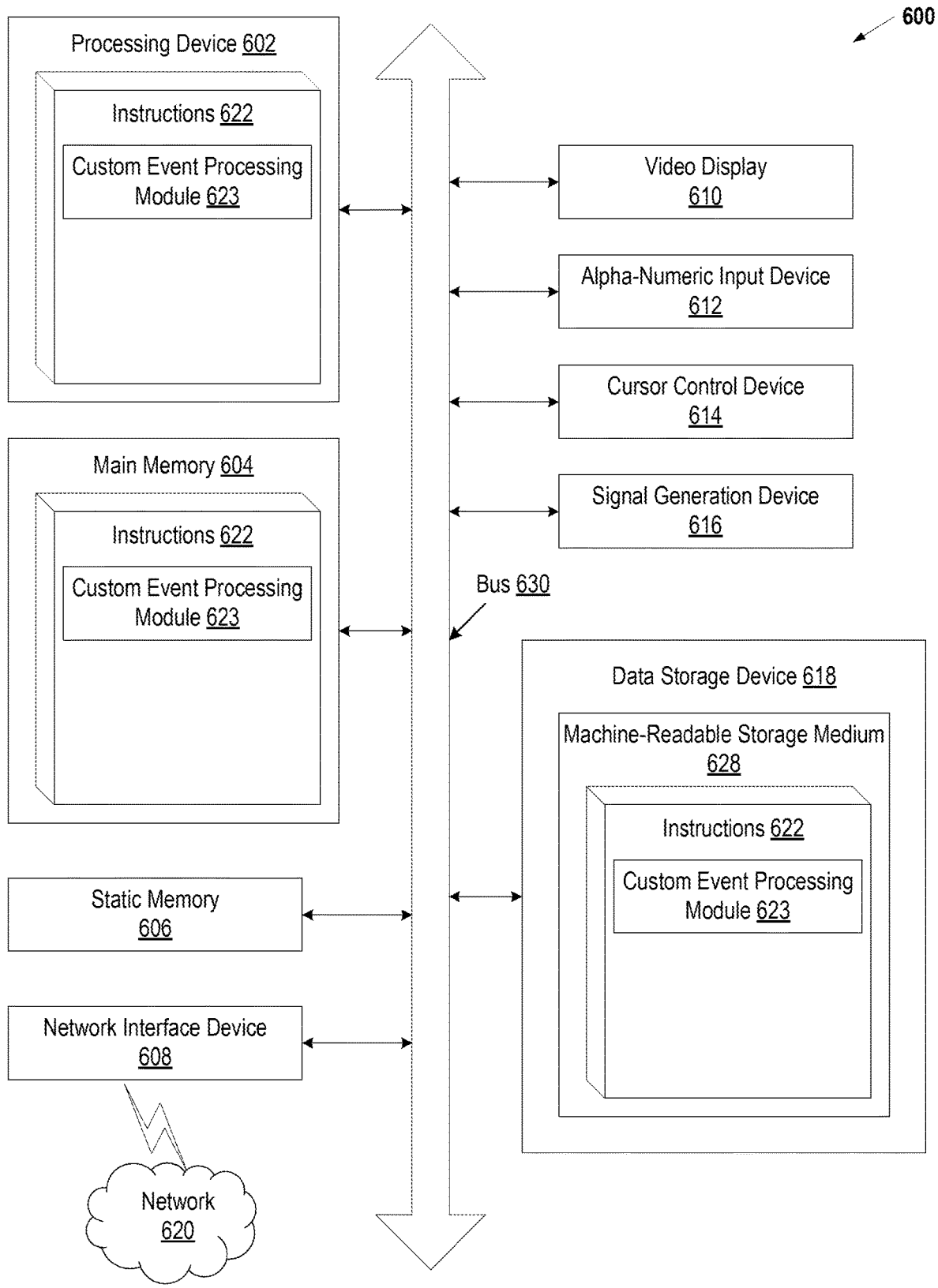
FIG. 6 is a block diagram of an example computer system that may perform one or more of the operations described herein.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM (RDRAM), etc.), a static memory 606 (e.g., flash memory, static random access memory (SRAM), etc.), and a data store device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT), an alphanumeric input device 612 (e.g., a keyboard), a cursor control device 614 (e.g., a mouse), and a signal generation device 616 (e.g., speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a custom event processing module 623 (e.g., custom event processing module 109 of FIG. 1), and/or a software library containing methods that call the custom event processing module 623. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving" or "selecting" or "changing" or "adding" or "replacing" or "performing" or "determining" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method comprising:
    receiving, by a processing device of an infrastructure management platform, a request to include a custom action in a processing definition, the custom action to be performed in response to an occurrence of an infrastructure event in an infrastructure platform;
    selecting the processing definition that specifies a default action to be performed in response to the occurrence of the infrastructure event, the default action being defined by the infrastructure management platform;
    receiving, by the infrastructure management platform, user input defining the custom action relative to the default action in the processing definition; and
    changing the processing definition to comprise the custom action relative to the default action, wherein changing the processing definition comprises adding the custom action to the processing definition and modifying an order of actions of the processing definition.

2. The method of claim 1, wherein the custom action comprises sending a message to a system in the infrastructure platform.

3. The method of claim 1, wherein modifying the order of the actions of the processing definition comprises adding the custom action to the processing definition to execute the custom action prior to executing the default action.

4. The method of claim 1, wherein modifying the order of the actions of the processing definition comprises adding the custom action to the processing definition to execute the custom action subsequent to executing the default action.

5. The method of claim 1, wherein modifying the order of the actions of the processing definition comprises replacing the default action with the custom action.

6. The method of claim 1, wherein the user input comprises at least one of a third party script, a third party definition of a method, or a definition of a redirection to an event handler.

7. The method of claim 1, wherein changing the processing definition comprises:
    adding the custom action to the processing definition to cause the custom action to be performed within a time threshold that is specified in a policy.

8. The method of claim 1, wherein changing the processing definition further comprises at least one of removing the default action, adding the default action, or changing the order of performing the default action.

9. The method of claim 1, further comprising receiving, by the infrastructure management platform, an event notification for the occurrence of the infrastructure event in the infrastructure platform, wherein the infrastructure platform to generate the event notification in JavaScript Object Notation (JSON) format and place the event notifications in at least one of a message queue or an event queue, and wherein the at least one of the infrastructure platform or the infrastructure management platform to format the event notification and publish the event notification as a feed.

10. The method of claim 1, wherein the infrastructure platform to send two event notifications for an individual task, wherein a first event notification of the two event notifications is generated at a beginning of a task and a second event notification of the two event notifications is generated at successful completion of the task, and wherein the two event notifications comprise a source identifier, an event name, a message identifier, and a payload comprising data pertaining to the infrastructure event.

11. The method of claim 1, wherein the default action comprises at least one of processing a control policy for the infrastructure event, sending a notification to a user or system, sending an alert to a user or system, raising another event, or triggering a refresh to retrieve details for the infrastructure event.

12. A non-transitory computer-readable storage medium including instructions that, when executed by a processing device, cause the processing device to:
    receive, by an infrastructure management platform, a request to include a custom action in a processing definition, the custom action to be performed in response to an occurrence of an infrastructure event in an infrastructure platform;

select the processing definition that specifies a default action to be performed in response to the occurrence of the infrastructure event, the default action being defined by the infrastructure management platform;

receive user input defining the custom action relative to the default action in the processing definition; and change the processing definition to comprise the custom action relative to the default action, wherein changing the processing definition comprises adding the custom action to the processing definition and modifying an order of actions of the processing definition.

13. The non-transitory computer-readable storage medium of claim 12, wherein the processing device to modify the order of the actions of the processing definition further comprises the processing device to replace the default action with the custom action.

14. The non-transitory computer-readable storage medium of claim 12, wherein the processing device to change the processing definition comprises the processing device to at least one of add the custom action to the processing definition to cause the custom action to be performed within a time threshold that is specified in a policy, remove the default action, add the default action, or change the order of performing the default action.

15. The non-transitory computer-readable storage medium of claim 12, wherein the processing device is further to receive an event notification for the occurrence of the infrastructure event in the infrastructure platform, wherein the infrastructure platform to generate the event notification in JavaScript Object Notation (JSON) format and place the event notifications in at least one of a message queue or an event queue, and wherein the at least one of the infrastructure platform or the infrastructure management platform to format the event notification and publish the event notification as a feed.

16. The non-transitory computer-readable storage medium of claim 12, wherein the infrastructure platform to send two event notifications for an individual task, wherein a first event notification of the two event notifications is generated at a beginning of a task and a second event notification of the two event notifications is generated at successful completion of the task, and wherein the two event notifications comprise a source identifier, an event name, a message identifier, and a payload comprising data pertaining to the infrastructure event.

17. A system comprising:
a memory; and
a processing device operatively coupled to the memory, to:
receive, by an infrastructure management platform, a request to include a custom action in a processing definition, the custom action to be performed in response to an occurrence of an infrastructure event in an infrastructure platform;

select the processing definition that specifies a default action to be performed in response to the occurrence of the infrastructure event, the default action being defined by the infrastructure management platform;

receive user input defining the custom action relative to the default action in the processing definition; and change the processing definition to comprise the custom action relative to the default action, wherein changing the processing definition comprises adding the custom action to the processing definition and modifying an order of actions of the processing definition.

18. The system of claim 17, wherein the processing device to modify the order of the actions of the processing definition further comprises the processing device to replace the default action with the custom action.

19. The system of claim 17, wherein the processing device to change the processing definition comprises the processing device to at least one of add the custom action to the processing definition to cause the custom action to be performed within a time threshold that is specified in a policy, remove the default action, add the default action, or change the order of performing the default action.

20. The system of claim 17, wherein the processing device is further to receive an event notification for the occurrence of the infrastructure event in the infrastructure platform, wherein the infrastructure platform to generate the event notification in JavaScript Object Notation (JSON) format and place the event notifications in at least one of a message queue or an event queue, and wherein the at least one of the infrastructure platform or the infrastructure management platform to format the event notification and publish the event notification as a feed.

* * * * *